US011912365B2

(12) United States Patent
Bogenschutz et al.

(10) Patent No.: US 11,912,365 B2
(45) Date of Patent: Feb. 27, 2024

(54) BACK SUPPORT

(71) Applicants: Josef Bogenschutz, Bisingen (DE); Andreas Tscheinig, Gratkorn (AT)

(72) Inventors: Josef Bogenschutz, Bisingen (DE); Andreas Tscheinig, Gratkorn (AT)

(73) Assignee: B & T INNOTEC GERMANY GMBH, Bisingen (DE)

( * ) Notice: Subject to any disclaimer, the term of this patent is extended or adjusted under 35 U.S.C. 154(b) by 76 days.

(21) Appl. No.: 17/770,224

(22) PCT Filed: Oct. 23, 2020

(86) PCT No.: PCT/DE2020/000255
§ 371 (c)(1),
(2) Date: Apr. 19, 2022

(87) PCT Pub. No.: WO2021/078317
PCT Pub. Date: Apr. 29, 2021

(65) Prior Publication Data
US 2022/0396327 A1 Dec. 15, 2022

(30) Foreign Application Priority Data
Oct. 24, 2019 (DE) .......................... 10 2019 007 411

(51) Int. Cl.
*B62J 1/28* (2006.01)
*B62J 11/04* (2020.01)

(52) U.S. Cl.
CPC ...... *B62J 1/28* (2013.01); *B62J 11/04* (2020.02)

(58) Field of Classification Search
CPC .................................. B62J 1/28; B62J 1/007
(Continued)

(56) References Cited

U.S. PATENT DOCUMENTS 4,313,639 A * 2/1982 Ware .......................... B62J 1/28
297/215.12
5,887,943 A * 3/1999 Lee ............................ B62J 1/28
297/215.1
(Continued)

FOREIGN PATENT DOCUMENTS

DE 4239548 A1 4/1993
DE WO201908659 A1 5/2019

OTHER PUBLICATIONS

International Search Report PCT/DE2020/000225 dated Feb. 12, 2021.

*Primary Examiner* — Sarah B McPartlin
(74) *Attorney, Agent, or Firm* — Ralph E. Jocke; WALKER & JOCKE

(57) ABSTRACT

A back support (1) for a pedal driven device or other device including a saddle which provides a seat for a user of the device, includes a mount (2) which may be releasably engageable with the device. A contact part (4) which is configured to contact the back of the user of the device, is movably mounted in operative connection with the mount in an articulated manner. The exemplary contact part includes a bracket (7, 20) that is rotatable relative to the mount about a bracket axis (14). The bracket operatively connects the mount and contact bodies (6, 23, 24, 26, 27, 31, 32). The contact bodies are movably mounted in rotatable operative connection with the bracket about respective contact body axes (9, 28, 30) which extend parallel to the bracket axis.

20 Claims, 4 Drawing Sheets

(58) Field of Classification Search
USPC .......................................... 297/215.1, 215.11
See application file for complete search history.

(56) References Cited

U.S. PATENT DOCUMENTS

| | | | |
|---|---|---|---|
| 6,206,399 B1 | 3/2001 | Schnitzenbaumer | |
| 8,382,139 B2 * | 2/2013 | Schexnayder | B62H 7/00 297/215.1 |
| 11,453,451 B2 * | 9/2022 | Bogenschuetz | B62J 1/28 |

* cited by examiner

BACK SUPPORT

TECHNICAL FIELD

Exemplary arrangements relate to a back support for pedal-driven devices, comprising a mount for fastening to a device and a contact part arranged thereon for supporting a back of a person using the device. The exemplary arrangements further also relate to a saddle comprising a back support of this type, and a device, in particular a bicycle comprising a saddle, comprising a back support of this type. However, exemplary arrangements include back supports of this type suitable for devices including bicycles, motorcycles, pedelecs, and other two-wheelers or pedal-operated vehicles, and also for sporting equipment, which is operated in a stationary manner, such as home trainers or fitness devices.

BACKGROUND

A generic back support is known from WO 2019/086059. This known saddle support provides a good counter support for a person, who is pedaling and who can support himself/herself on this back support with the back, and in particular with the lower back area. Back supports of this type are usually fastened to the saddle and/or to the saddle post.

GB 1911/12 532 A relates to a bicycle, in which the back support is arranged in a resilient manner on a vertical strut. Back supports comprising a cushion, which is arranged in an articulated manner, are shown in U.S. Pat. No. 6,206,399 B1 the disclosure of which is incorporated herein by reference in its entirety.

Back supports of this type may benefit from improvements.

SUMMARY

Exemplary arrangements provide an improved back support for pedal driven devices and other types of devices which include a saddle that provides a seat for a user.

Saddle supports may have contact bodies, such as balls or rollers, which are arranged movably mounted. It has been found, however, that it is useful when the entire contact part with the contact bodies arranged thereon is connected in an articulated manner to a mount. In some exemplary arrangements this makes it possible to fix the contact part in a certain position relative to the mount or to also enable it to move in a pivotable manner. A lever arm provided by a bracket that extends operatively between the mount and a contact body provides for positioning of the contact body on a curved line around the articulated connection between contact part and mount. In exemplary arrangements the height of the contact part and in particular of contact bodies can thus be set individually. In addition, in some exemplary arrangements the contact part can be easily removed from the mount when it is not required, for example when riding downhill, or in situations where it interferes.

In some exemplary arrangements it is useful that the contact part has several contact bodies, which are each connected to the mount in an articulated manner.

In addition, in exemplary arrangements the contact part has a bracket, which is movably arranged on the mount in an articulated manner. An exemplary bracket of this type can have an I-shaped cross section, in order to connect the mount and the contact body to one another as a lever.

Another exemplary arrangement includes a contact part that has several contact bodies, which are connected to one another via the bracket, which bracket is connected to the mount in an articulated manner. It is useful thereby when the bracket has an L-shaped cross section or is formed in an L-shaped manner. The angle of the L of the legs thereby does not have to be exactly 90°. The legs can, for example, also be arranged in a V-shaped manner to extend relative to one another at an acute or obtuse angle.

The L-shaped bracket configuration makes it possible to firmly position the contact bodies at a specific distance from one another. The position is thereby determined by means of the length of the legs of the bracket and the angle of the legs to one another. In some arrangements the bracket can furthermore not only be firmly fastened in fixed connection to the mount, but can also be fastened to the mount in a rotationally movable manner. As a result, the contact part can swing about a bracket axis of rotation to change the relative positions between the contact part and the mount when riding a bike by means of the pressure applied by the rider, in order to form a corresponding counter pressure on the one hand, and, on the other hand, to also be able to yield so that the contact bodies rest optimally against the back of the rider. The contact bodies are arranged in some exemplary arrangements at a distance transversely to the riding direction, and the elastically cushioned surface thereof furthermore in some arrangements also provide for a certain adaptation about a vertical axis of rotation, when the contact bodies are particularly strained initially on one side when riding, and then the contact bodies on the other side of the bicycle.

In some exemplary arrangements to provide good ergonomic adaptation when riding, the bracket has two legs with different lengths.

In some exemplary arrangements a simple, light setup is provided when the bracket has two legs, which are arranged at a right, acute, or obtuse angle, for example of approximately 90°.

Geometrical bodies of different formations can be used in exemplary arrangements as contact bodies. It is useful in some arrangements when the contact body is a ball. It is useful in some arrangements when the ball can either be rotated about a contact body axis on a shaft or is rotatably mounted in a cage. The contact body in some arrangements can also be a roller. It is useful thereby when the roller can be rotated about its central axis.

In exemplary arrangements at least one contact body is operatively connected to the bracket so that it can be rotated about a contact body axis.

The exemplary configuration of ball-shaped or roller-shaped contact bodies, which can be rotated about a contact body axis, a bracket, via which the contact bodies are connected to one another and which bracket is connected to the mount in an articulated manner, wherein the contact body axis is rotatably connected to the bracket, provides for a simple and individual adaptation of the back support to the rider of the pedal-driven device. The exemplary back support forms a counter support for the forces acting on the pedals, it applies itself optimally to the back of the rider, and it also acts laterally as counter support, in order to hold the rider, who moves the back to the side when pedaling, on the saddle. The exemplary round contact bodies prevent a sliding relative movement between the contact bodies and the back of the rider. The exemplary bracket positions the contact bodies optimally to the back, in particular in the riding direction. It thereby also provides for an adaptation in a perpendicular direction thereto.

Due to the fact that particular attention is paid to the weight of exemplary arrangements used in the case of bicycles, a useful aspect of the exemplary back support is that it meets the demands on stability, ergonomics, and lightness with simple means even in response to the dynamic weight shifts when riding.

It is useful in some exemplary arrangements when at least one contact body can be attached to the contact body axis.

It is useful in some exemplary arrangements when, together with at least one contact body, the contact body axis extends along a shaft that is rotatable relative to the bracket.

An exemplary arrangement provides that the bracket is moveably connected to the mount so that it can rotate about a bracket axis.

It is useful in some exemplary arrangements when the contact body axis is arranged parallel to the bracket axis.

In some exemplary arrangements, a bracket is used, which has three parallel bores with respective centers that correspond respectively to the bracket axis and two contact body axes. This makes it possible to hold all axes in fixed relative positions yet in a movable manner relative to the mount. The exemplary contact bodies can thus be supported in a rotationally movable manner relative to the mount, and the exemplary bracket can furthermore be fastened to the mount in a rotationally movable manner. The exemplary entire contact part comprising the rotatable contact bodies can thus rotate about the bracket axis relative to the mount while riding. As a result, in some exemplary arrangements the contact part optimally positions itself independently.

The mount of exemplary arrangements of the back support can be produced easily and in a stable manner when it comprises a framework with a plurality of openings therethrough.

In some exemplary arrangements a more varied use of the back support is achieved when the mount is dividable and separable into two portions. The upper part that includes the bracket and the contact bodies can be removed to save weight, while the lower part remains fastened to the saddle post. However, in some arrangements other parts, such as a rack, a water bottle, a child seat, etc., can also be fastened to the lower part in a simple manner. It is useful in some arrangements when the mount is dividable and separable in the lower third when installed. The weight can thus be reduced significantly by removing the upper part, that includes the bracket and the contact bodies and the division area can then be accessed well behind the saddle. In some other exemplary arrangements, the mount is dividable approximately at the height of the saddle.

In an exemplary arrangement the mount has a first part comprising a sleeve, and a second part comprising a trunnion, wherein the trunnion can be inserted into the sleeve, in order to connect a first part and a second part to one another.

In addition, in an exemplary arrangement the mount can have a locking means, in order to securely connect the first and second parts to one another, which are inserted into one another. This exemplary locking means can comprise a locking fastener including a lever, a screw connection, a button, or locking button, or other component which has to be actuated in order to release the separable parts of the mount. A lock, which prevents an unauthorized division of the mount, can also be used in exemplary arrangements in this connection.

Exemplary arrangements are illustrated in the drawings and will be described in more detail below.

DETAILED DESCRIPTION

Figure 1:
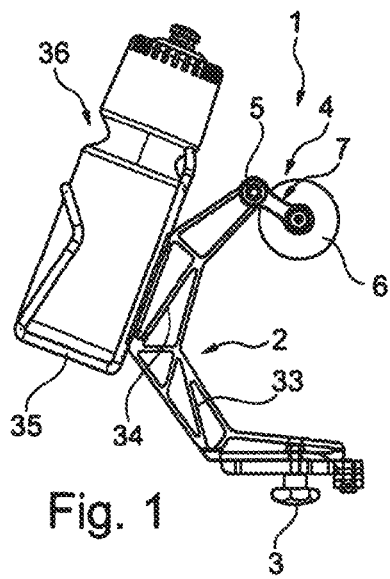
FIG. 1 shows a schematic illustration of an exemplary back support comprising one contact body.
Figure 2:
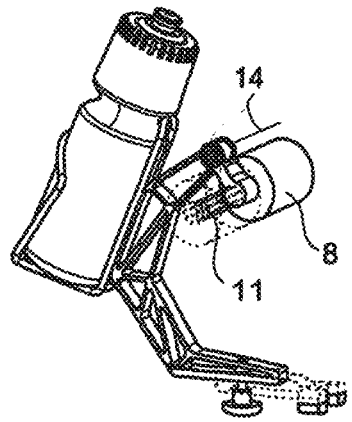
FIG. 2 shows a perspective view of the back support shown in FIG. 1, with a contact body comprising two rollers one of which is shown in phantom.
Figure 3:
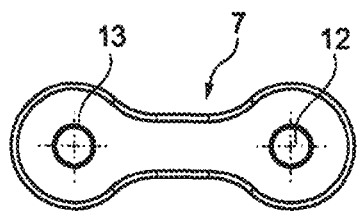
FIG. 3 shows a section through an I-shaped bracket.
Figure 4:
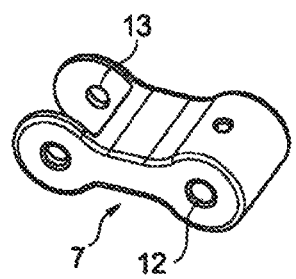
FIG. 4 shows a perspective view of the bracket shown in FIG. 3.
Figure 5:
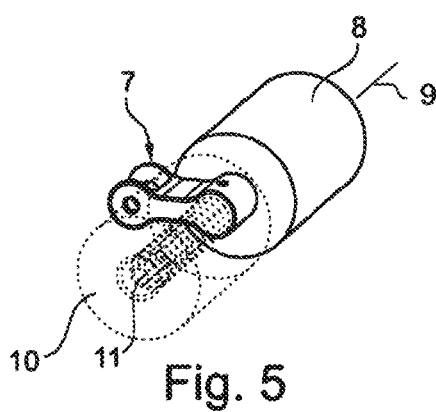
FIG. 5 shows a perspective view of a contact body having a roller configuration.
Figure 6:
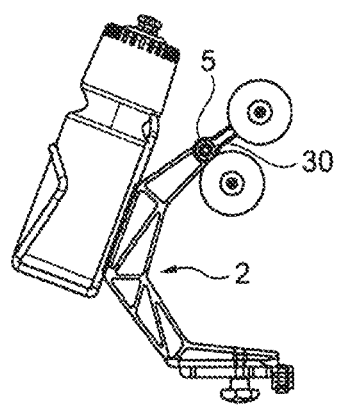
FIG. 6 shows a schematic view of an alternative exemplary arrangement.

The exemplary back support 1 shown in FIG. 1 includes a mount 2, which is alternatively referred to as a beam. The exemplary mount can be fastened to a saddle of a bicycle (not shown) or to another pedal-driven device by means of a manually operable screw 3. The mount extends behind and above the saddle. A contact part 4 serves to support the back of a person (not shown) operating the device. This contact part is fastened to the mount 2 in an articulated manner. The exemplary contact part is configured to be capable of being fixed in various rotational positions by means of a locking fastener such as a locking screw 5 or to be moveable during operation.

In this exemplary arrangement, a bracket 7 with an I-shaped cross section serves as a movable connection between a contact body 6 and the mount 2. The contact body 6 comprises a cylindrical roller 8, which is moveably mounted in rotatable connection with the bracket 7 so as to be capable of being rotated about a contact body axis 9 that in the exemplary arrangement extends horizontally as shown. For this purpose, the contact body 6 can simply be attached to a shaft that extends along contact body axis 9. The contact body 6 can be movable along the back of a bicycle rider that is seated on the saddle by means of the bracket 7 by not being fixed in position by the locking fastener or alternatively can be locked in a position, which individually matches the bicycle rider (variator).

In this exemplary arrangement rollers 8 and 10, which are firmly connected to shaft 11 and rotatable about the contact body axis 9, are in each case arranged on both horizontal sides of the bracket 7. The contact bodies 8 and 10, which extend along the contact body axis 9 are rotatable as shaft 11 is rotatable relative to the bracket 7. The bracket is also rotatable relative to the mount. For this purpose, the exemplary bracket 7 has a first bore 12 for the shaft 11. On the other end of the bracket 7, there is a bore 13 which in the operative position is centered relative to a bracket axis 14, which is vertically above the saddle and about which the contact part 4 is rotatably connected to the mount 2. The contact body axis 8 is thereby arranged parallel to the bracket axis 14.

Figure 7:
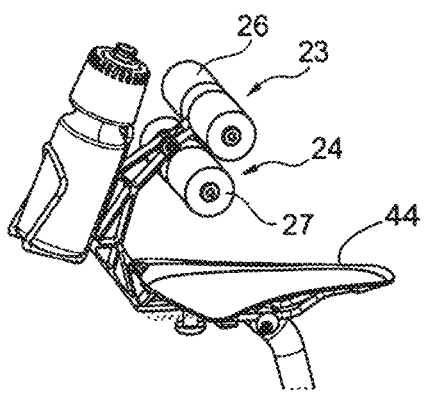
FIG. 7 shows a perspective view of the back support shown in FIG. 6.
Figure 8:
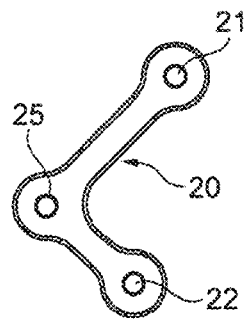
FIG. 8 shows a section through an L-shaped bracket.
Figure 9:
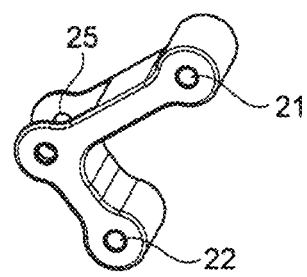
FIG. 9 shows a perspective view of the L-shaped bracket shown in FIG. 8.
Figure 10:
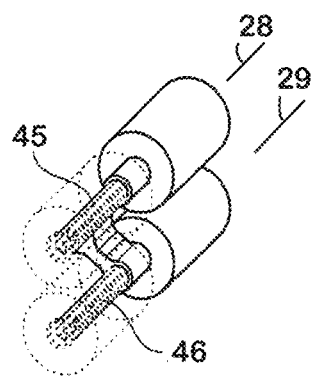
FIG. 10 shows a perspective view of two contact bodies having a roller configuration.

The further exemplary arrangement shown in FIGS. 6 to 12 is essentially constructed like the exemplary arrangement shown in FIGS. 1 to 5. In FIG. 7 the saddle 44 is shown. In this arrangement the bracket 20, however, has an L-shaped cross section, in order to hold respective contact bodies 23, 24 at spaced-apart ends on shafts that extend through bores 21 and 22. With the bore 25 through which the bracket axis extends lying vertically therebetween, the bracket 20 is rotatable about the bracket axis or selectively held in a fixed rotational position on the mount 2 by means of a locking screw 5.

Figure 11:
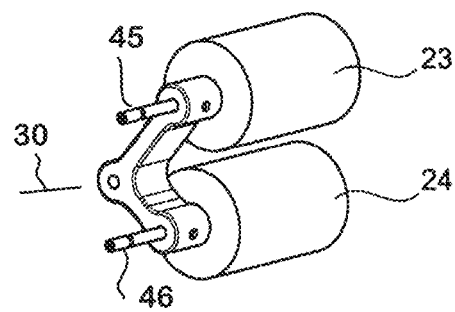
FIG. 11 shows the contact bodies shown in FIG. 10 and comprising the L-shaped bracket shown in FIG. 9.

In the case of this exemplary arrangement, the contact bodies 23, 24 are also formed as rollers 26, 27, which are operatively attached to bracket 20 to be rotatable about a contact body axis 28, 29. The bores 21, 22 and 25 of the bracket 20 are provided for a bracket axis 30 along which the locking fastener 5 extends and a pair of shafts 45, 46 which respectively extend along the two contact body axes 28, 29. The exemplary contact parts 23 and 24 are secured with a bore with a thread in the shaft 11 by means of a washer and screw so that the contact parts cannot fall down laterally in response to strong pressure during the movement of the rider in the lateral direction (Z-direction). These washers can be seen well in FIGS. 6 and 7. FIG. 11 shows the contact parts 23 and 24 and the shafts 45 and 46, in which the bore with the thread is located on the front side, in order to attach a screw with a safety washer there.

Figure 12:
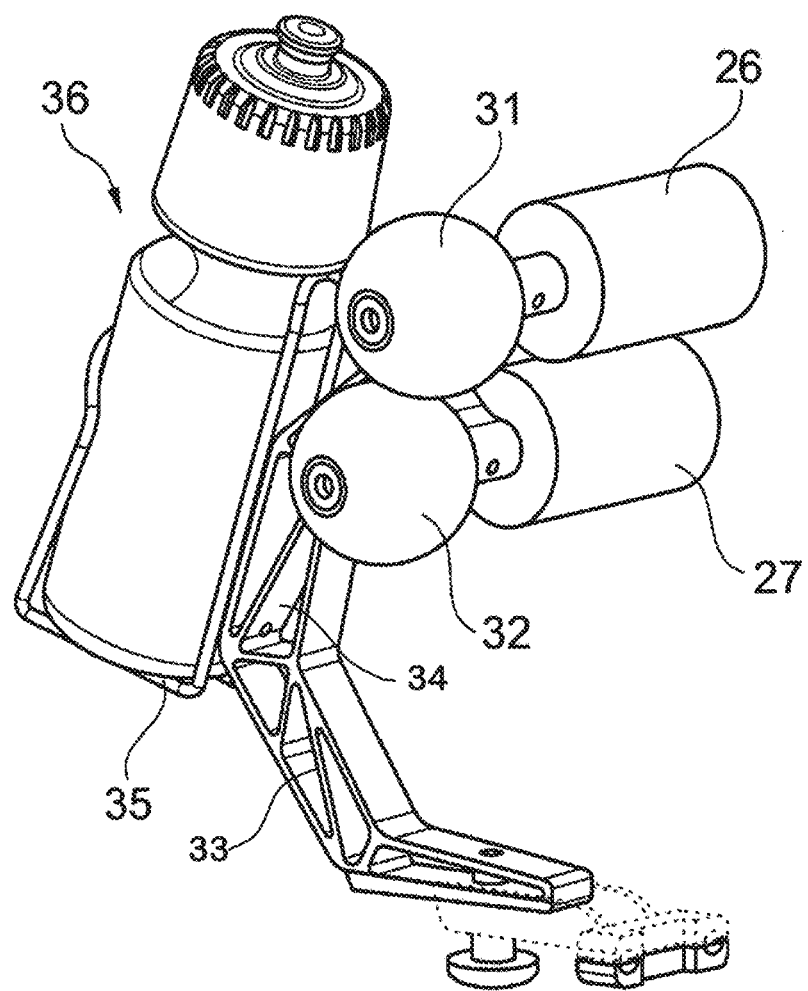
FIG. 12 shows a back support comprising contact bodies, which are ball-shaped on one side, and contact bodies, which have a roller configuration, on the other side.

FIG. 12 shows, in an exemplary arrangement how balls 31, 32 as well as rollers 26, 27 can be used on contact body axes.

The exemplary mount 2 has various struts 33, 34 (only numbered in an exemplary manner), by means of which the mount 2 is constructed as a framework and with openings therethrough.

In the exemplary arrangement, a drinking bottle holder 35, which releasibly receives a beverage holding container comprised of a drinking bottle 36, is fastened to this mount 2.

Figure 13:
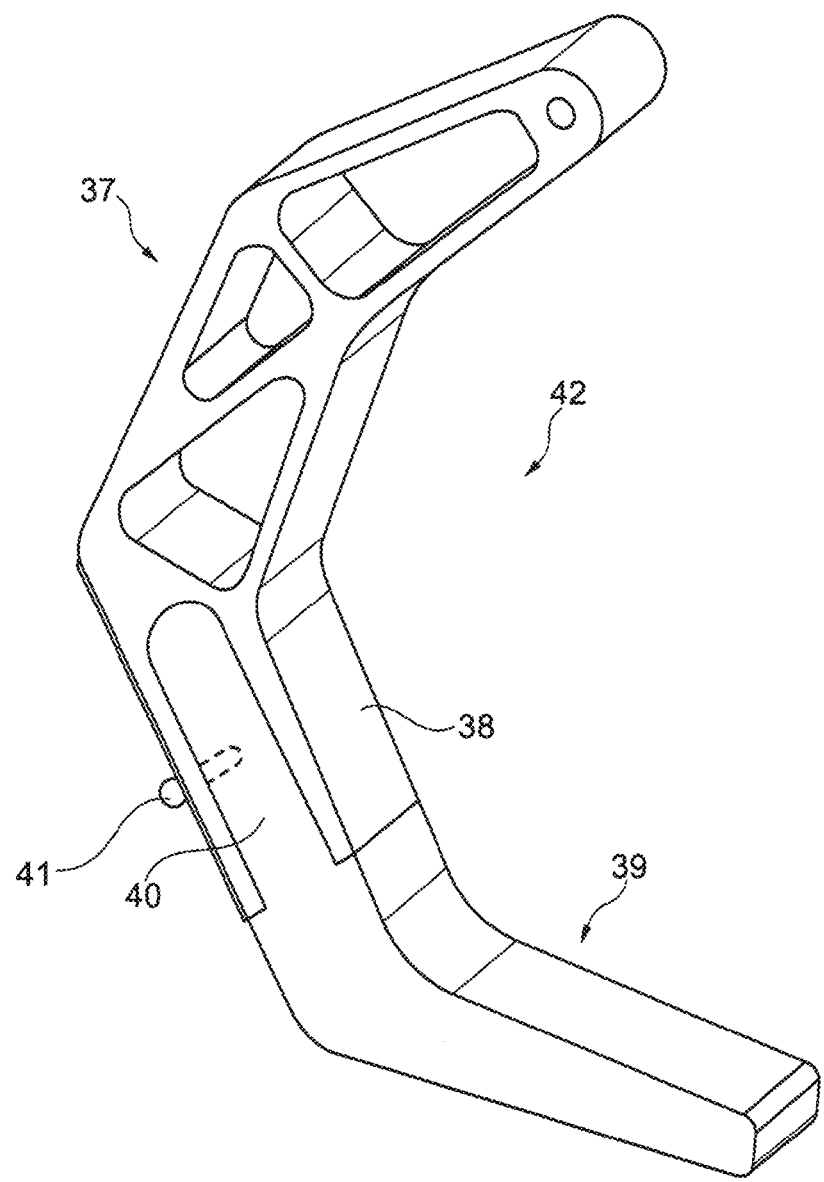
FIG. 13 shows a dividable mount.

The exemplary alternative mount shown in FIG. 13 is dividable and separable into two separate portions. For this purpose, the mount 42 has a first part 37 which is alternatively referred to herein as a first portion, comprising a sleeve 38, and a second part 39 alternatively referred to herein as a second portion, comprising a trunnion 40. In this exemplary arrangement the trunnion 40 can be inserted into and engaged in the sleeve 38, in order to connect first part 37 and second part 39 to one another. A locking means 41 comprises a locking fastener or other suitable member for holding the first and second parts in engagement. In an exemplary arrangement a small pin, which extends transversely through the sleeve 38 and the trunnion 40, may be used in order to prevent that the second part 39 from being separated from the first part 37

Thus the exemplary arrangements achieve improved operation, eliminate difficulties encountered in the use of prior devices and arrangements, and achieve the useful results described herein.

In the foregoing description certain terms have been used for brevity, clarity and understanding. However no unnecessary limitations are to be implied therefrom because such terms are used for descriptive purposes and are intended to be broadly construed. Moreover the descriptions and illustrations herein are by way of examples and the new and useful concepts are not limited only to the exact features and relationships that have been shown and described.

Having described features, discoveries and principles of the exemplary arrangements, the manner in which they are constructed and operated, and the advantages and useful results attained, the new and useful features, devices, elements, arrangements, parts, combinations, systems, equipment, operations, methods processes and relationships are set forth in the appended claims.

The invention claimed is:

1. An apparatus comprising:
a back support configured for operative connection to a pedal driven device,
the back support including:
 a mount, wherein the mount is configured to be engaged with the pedal driven device,
 a contact part, wherein the contact part includes
  a bracket, wherein the bracket includes first, second and third bores,
   wherein each of the first, second and third bores extend parallel to one another,
   wherein the bracket
    is rotatably operatively connected to the mount via the first bore, and
    is rotatable relative to the mount about a bracket axis,
 a plurality of contact bodies, wherein
  the plurality of contact bodies include at least one ball or at least one roller configured to engage a back of an individual operating the pedal driven device,
  each contact body is in operatively supported rotatable connection with the bracket and is rotatable relative to the bracket about a respective contact body axis,
   wherein the respective contact body axis extends in centered relation relative to one of the second and third bores,
  the bracket is operative to hold each of the contact bodies in operative connection with the mount and in operative connection with each of the other contact bodies.

2. The apparatus according to claim 1
wherein the bracket has an I-shaped cross section.

3. The apparatus according to claim 1
wherein the bracket has an L-shaped cross-section.

4. The apparatus according to claim 1
wherein the bracket has an L-shaped cross-section, and two legs of different lengths.

5. The apparatus according to claim 1
wherein the bracket in cross-section includes two legs that extend at an angle of approximately 90° to one another.

6. The apparatus according to claim 1
and further including
at least one locking fastener in operative connection with the mount and the bracket,
wherein the at least one locking fastener is operative to selectively releasably hold the contact part fixed in a plurality of rotational positions relative to the mount.

7. The apparatus according to claim 1
wherein the mount includes two separable portions,
wherein in a separated condition of the mount a first portion is connected to the device and a second portion is connected to the contact part,
whereby the second portion and the contact part is removable from the pedal driven device by separation of the first and second portions.

8. The apparatus according to claim 1
wherein the mount includes two separable portions, wherein in a separated condition of the mount a first portion is connected to the device and a second portion is connected to the contact part, wherein the first portion comprises a sleeve, and the second portion comprises a trunnion, wherein the trunnion is releasably insertable into the sleeve, whereby the second portion and the contact part is removable from the device through disengagement of the trunnion and the sleeve.

9. The apparatus according to claim 1
wherein the mount includes two separable portions,
wherein in a separated condition of the mount a first portion is connected to the device and a second portion is connected to the contact part,
wherein the first portion comprises a sleeve, and the second portion comprises a trunnion, wherein the trunnion is releasably insertable into the sleeve,
and further including a locking fastener, wherein the locking fastener is selectively operative to hold the trunnion and the sleeve in engaged relation,
whereby responsive to releasing the locking fastener, the trunnion is removable from the sleeve and the contact part is removable from the device through disengagement of the trunnion and the sleeve.

10. The apparatus according to claim 1
wherein the mount is comprised of a framework with a plurality of openings therethrough.

11. The apparatus according to claim 1
and further comprising a saddle,
wherein the saddle includes the back support.

12. The apparatus according to claim 1
and further comprising a bicycle,
wherein the bicycle includes a saddle,
wherein the saddle includes the back support.

13. The apparatus according to claim 1
and further comprising:
a holder configured to releasably hold a beverage container,
wherein the holder is in operative attached connection with the mount.

14. An apparatus comprising:
a back support configured for operative connection to a device including a saddle which provides a seat for a user of the device,
the back support including:
a beam, wherein the beam
is configured to be in fixed operatively attached connection with the device, and
in an operative position extends vertically above and behind the saddle,
a bracket, wherein the bracket
is in rotatably movably mounted in operatively engaged connection with the beam,
wherein the bracket is rotatably movable relative to the beam about a bracket axis,
wherein the bracket axis extends generally horizontally, and is vertically above and behind the saddle,
a plurality of contact bodies, wherein
each of the contact bodies is configured to operatively engage a back of the user positioned on the saddle,
is rotatably mounted in operative supported connection with the bracket,
each contact body is rotatable relative to the bracket about a respective contact body axis that extends parallel to the bracket axis.

15. The apparatus according to claim 1
and further comprising:
at least one shaft in operatively attached connection with the bracket,
wherein the at least one shaft extends along the a respective contact body axis,
wherein at least one contact body is rotatable in supported connection with the at least one shaft.

16. The apparatus according to claim 14
and further comprising:
at least one shaft in operatively attached connection with the bracket,
wherein the at least one shaft extends along a respective contact body axis,
wherein at least two contact bodies are rotatable in supported connection with the at least one shaft.

17. The apparatus according to claim 14
and further comprising:
at least one shaft in operatively attached connection with the bracket,
wherein the at least one shaft extends along a respective contact body axis and is rotatable relative to the bracket,
wherein at least one contact body is rotatable in supported connection with the at least one shaft.

18. The apparatus according to claim 14
wherein the bracket has an L-shaped cross-section, and two legs of different lengths.

19. The apparatus according to claim 14
and further including
at least one locking fastener,
wherein the at least one locking fastener is in operative connection with the bracket and the beam,
wherein the at least one locking fastener is operative to selectively releasably hold the bracket fixed in a plurality of rotational positions relative to the beam about the bracket axis.

20. The apparatus according to claim 14
and further including
a holder configured to releasably hold a beverage container,
wherein the holder is in operative attached connection with the beam.

* * * * *